United States Patent
Yen

(10) Patent No.: US 9,112,245 B2
(45) Date of Patent: Aug. 18, 2015

(54) RECHARGEABLE BATTERY MODULE, BATTERY-POWERED ELECTRONIC DEVICE, AND BATTERY-CHARGING METHOD

(71) Applicant: Quanta Computer Inc., Kuei Shan Hsiang, Tao Yuan Shien (TW)

(72) Inventor: Wei-Ting Yen, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 423 days.

(21) Appl. No.: 13/662,937

(22) Filed: Oct. 29, 2012

(65) Prior Publication Data

US 2013/0257350 A1  Oct. 3, 2013

(30) Foreign Application Priority Data

Apr. 3, 2012  (TW) .............................. 101111788 A

(51) Int. Cl.
*H02J 7/04* (2006.01)
*H01M 10/44* (2006.01)
*H01M 10/48* (2006.01)
*H02J 7/00* (2006.01)

(52) U.S. Cl.
CPC ............ *H01M 10/44* (2013.01); *H01M 10/443* (2013.01); *H01M 10/48* (2013.01); *H01M 10/486* (2013.01); *H02J 7/0091* (2013.01)

(58) Field of Classification Search
CPC .. H01M 10/443; H01M 10/486; H02J 7/0091
USPC .................................................. 320/107, 150
See application file for complete search history.

(56) References Cited

U.S. PATENT DOCUMENTS

| | | | |
|---|---|---|---|
| 2004/0070369 A1* | 4/2004 | Sakakibara | 320/128 |
| 2005/0017676 A1* | 1/2005 | Takimoto et al. | 320/107 |
| 2008/0284379 A1* | 11/2008 | Hirano | 320/150 |
| 2009/0027056 A1* | 1/2009 | Huang et al. | 324/439 |
| 2009/0195176 A1* | 8/2009 | Suzuki et al. | 315/277 |

* cited by examiner

*Primary Examiner* — Drew A Dunn
*Assistant Examiner* — Zixuan Zhou
(74) *Attorney, Agent, or Firm* — McClure, Qualey & Rodack, LLP

(57) ABSTRACT

A rechargeable battery module includes a battery cell, a load detector, a temperature sensor, a power consumption classifier and a battery charging controller. The power consumption classifier classifies a power consumption of the battery cell based on the load detected by the load detector and the temperature sensed by the temperature sensor. The battery charging controller collects a series of classified results output from the power consumption classifier to control a charging rate of the battery cell accordingly.

8 Claims, 6 Drawing Sheets

RECHARGEABLE BATTERY MODULE, BATTERY-POWERED ELECTRONIC DEVICE, AND BATTERY-CHARGING METHOD

CROSS REFERENCE TO RELATED APPLICATIONS

This application claims priority of Taiwan Patent Application No. 101111788, filed on Apr. 3, 2012, the entirety of which is incorporated by reference herein.

BACKGROUND OF THE INVENTION

1. Field of the Invention

The present invention relates to a rechargeable battery module, a battery-powered electronic device and a battery-charging method.

2. Description of the Related Art

The design of a rechargeable battery module depends on the chemical properties of materials therein.

For example, the chemicals inside of a Lithium battery should always be activated. In a case where the discharging of a battery becomes excessive, the chemicals inside of the battery may crystallize and thus, shorten the lifespan of the battery. In another case where the charging of a battery becomes excessive, the battery may deteriorate. The conventional battery charging/discharging techniques with constant-voltage or -current are not capable of appropriately handling the problems of chemical crystallization and battery deterioration.

BRIEF SUMMARY OF THE INVENTION

A rechargeable battery module, a battery-powered electronic device and a battery-charging method are disclosed.

A rechargeable battery module in accordance with an exemplary embodiment of the invention comprises a battery cell, a load detector, a temperature sensor, a power consumption classifier and a battery charging controller. The power consumption classifier classifies a power consumption based on a load detected by the load detector and a temperature sensed by the temperature sensor. The battery charging controller collects a series of classified results output from the power consumption classifier to control a charging rate of the battery cell accordingly. The battery cell, therefore, is dynamically charged according to the actual power consumption thereof.

According to another exemplary embodiment of the invention, a battery-powered electronic device is shown, which is powered by a rechargeable battery module of the disclosure. The disclosed rechargeable battery module is assembled to the device body of the battery-powered electronic device. The device body is coupled to a power source via an adaptor and a power line to charge the rechargeable battery module.

A battery-charging method in accordance with an exemplary embodiment of the invention comprises the following steps: detecting a load at a battery cell; sensing a temperature; classifying a power consumption based on the detected load and the sensed temperature; and collecting a series of classified results and, accordingly, controlling a charging rate of the battery cell.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
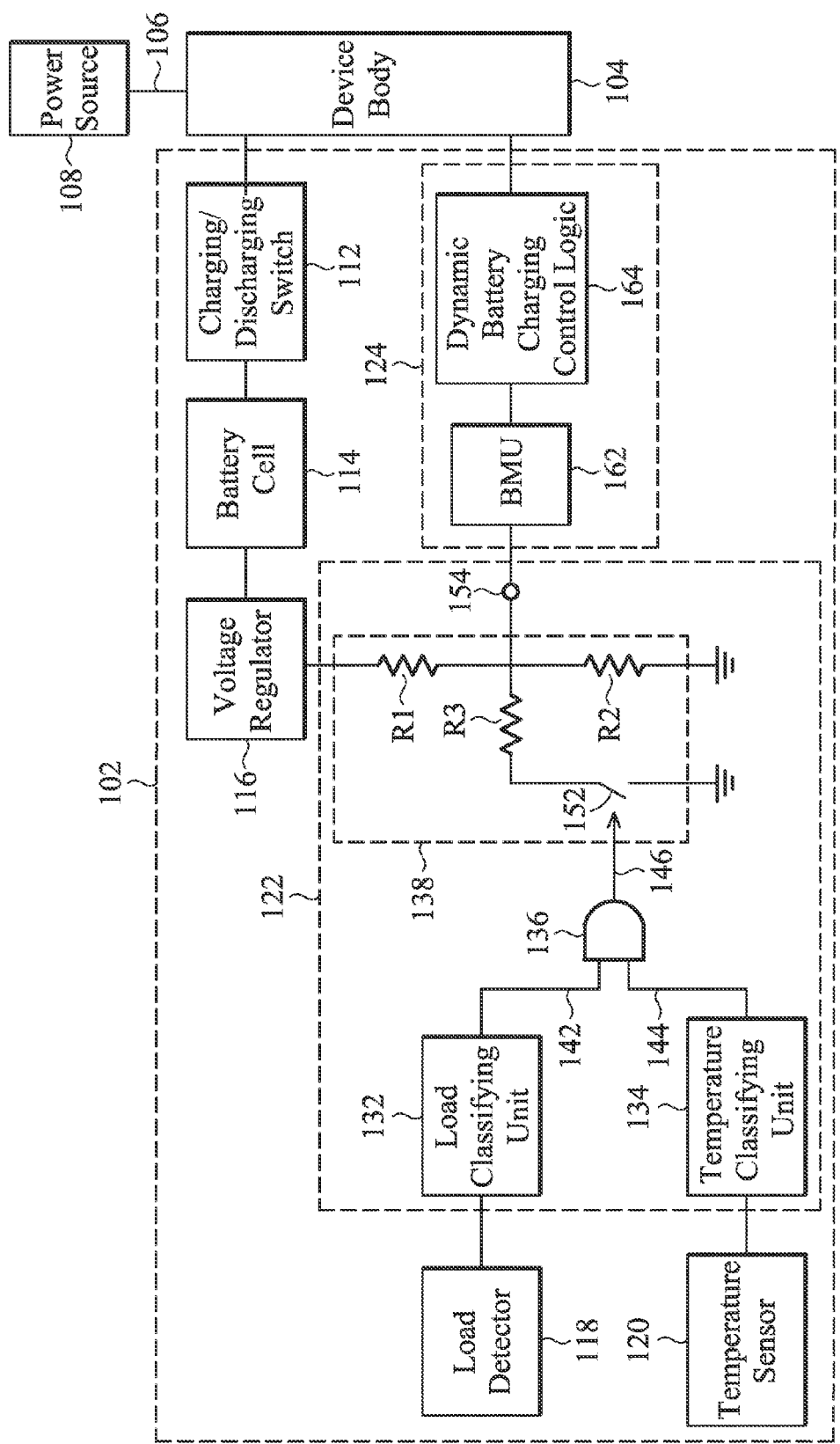
FIG. 1 depicts a battery-powered electronic device in accordance with an exemplary embodiment of the invention.

FIG. 1 depicts an electronic device in accordance with an exemplary embodiment of the invention, which is powered by a battery. As shown, the electronic device comprises a rechargeable battery module 102 and a device body 104. The rechargeable battery module 102 is assembled to the device body 104. The device body 104 is coupled to a power source 108 via an adaptor and a power line (as shown, the adaptor and the power line are simplified to a connection line 106) to charge the rechargeable battery module 102. The rechargeable battery module 102 may include a charging/discharging switch 112 for building current paths to charge or discharge a battery cell 114 of the rechargeable battery module 102. Further, the rechargeable battery module 102 may further include a voltage regulator 116, by which the power provided by the battery cell 114 is transformed to a regular voltage source to power the circuits or modules within the rechargeable battery module 102.

Further, the rechargeable battery module 102 comprises a load detector 118, a temperature sensor 120, a power consumption classifier 122 and a battery charging controller 124. The load detector 118 is for load detection and may be implemented by an overload protection design. The temperature sensor 120 senses a temperature and may be implemented by a thermistor. The power consumption classifier 122 is for power consumption classification, which is based on a load detected by the load detector 118 and the temperature sensed by the temperature sensor 120. The battery charging controller 124 collects a series of classified results output from the power consumption classifier 122 to modify a charging rate (as known as a C-rate) of the battery cell 114 accordingly. As shown, the battery charging controller 124 conveys the information about the charging rate to the device body 104. Based on the received information, the device body 104 modifies the speed that the power source 108 charges the battery cell 114. In the following, exemplary embodiments of the power consumption classifier 122 and the battery charging controller 124 are shown in detail.

Referring to FIG. 1, the power consumption classifier 122 may include a load classifying unit 132, a temperature classifying unit 134, a logic circuit 136 and a voltage dividing circuit 138. The load classifying unit 132 is coupled to the load detector 118. According to the load detection performed by the load detector 118, the load classifying unit 132 outputs a load flag 142 to show whether a high load condition or a low load condition has been satisfied. In an exemplary embodiment, a load threshold is provided. It is determined that a high load condition has been satisfied by the detected load when the detected load is heavier than the load threshold. It is determined that a low load condition has been satisfied by the detected load when the detected load is lower than the load threshold. The temperature classifying unit 134 is coupled to the temperature sensor 120. The temperature classifying unit 134 outputs a temperature flag 144 to show whether a high temperature condition or a low temperature condition has been satisfied. In an exemplary embodiment, a temperature threshold is provided. It is determined that a high temperature condition has been satisfied by the sensed temperature when the sensed temperature is higher than the temperature threshold. It is determined that a low temperature condition has been satisfied by the sensed temperature when the sensed temperature is lower than the temperature threshold. The logic circuit 136 outputs a control signal 146 based on the load flag 142 and the temperature flag 144. In the embodiment of FIG. 1, the control signal 146 is at a high voltage level (which is regarded as a first voltage level) when the low load condition and the low temperature condition have both been satisfied. Otherwise (when both the low load condition and the high temperature condition have been satisfied, or, both the high load condition and the low temperature condition have been satisfied, or, both the high load condition and the high temperature condition have been satisfied,) the control signal 146 is at a low voltage level (which is regarded as a second voltage level). A control transistor 152 of the voltage dividing circuit 138 is controlled according to the control signal 146. The voltage dividing circuit 138 is discussed in the following. As shown, the voltage source formed by the voltage regulator 116 is coupled to a ground terminal via a first resistance component R1 and a second resistance component (R2 or R2//R3) of the voltage dividing circuit 138. Based on the control signal 146, the control transistor 152 is controlled to set the second resistance component to be R2 or R2//R3. In the exemplary embodiment shown in this figure, the control transistor 152 is turned on when the control signal 146 is at the high voltage level due to the low load and low temperature conditions being met. Due to control transistor 152 being turned-on, the resistance of the second resistance component is switched from R2 to R2//R3 and the voltage level at the output terminal 154 of the voltage dividing circuit 138 is pulled down to show the low load and low temperature conditions of the battery cell 114.

The circuit of FIG. 1 is not intended to limit the implementations of the power consumption classifier 122. Other circuit design may be used to replace the voltage dividing circuit 138 shown in FIG. 1. For example, the control transistor may be used in controlling the resistance of the first resistance component rather than controlling the resistance of the second resistance component. In this case, the output terminal of the voltage dividing circuit is still capable of reflecting the low load and low temperature conditions. Or, in other exemplary embodiments, the power consumption classifier 122 may classify the load or the temperature into three or more levels. For example, the detected load may be classified as a low load, middle load or high load, and, the detected temperature may be classified as a low temperature, normal temperature or high temperature. Accordingly, the logic circuit and the voltage dividing circuit are modified to cope with multi-level classifications.

As for the battery charging controller 124, it may be implemented by a battery management unit (BMU) 162 of the rechargeable battery module 102 and a dynamic battery charging control logic 164.

Figure 2:
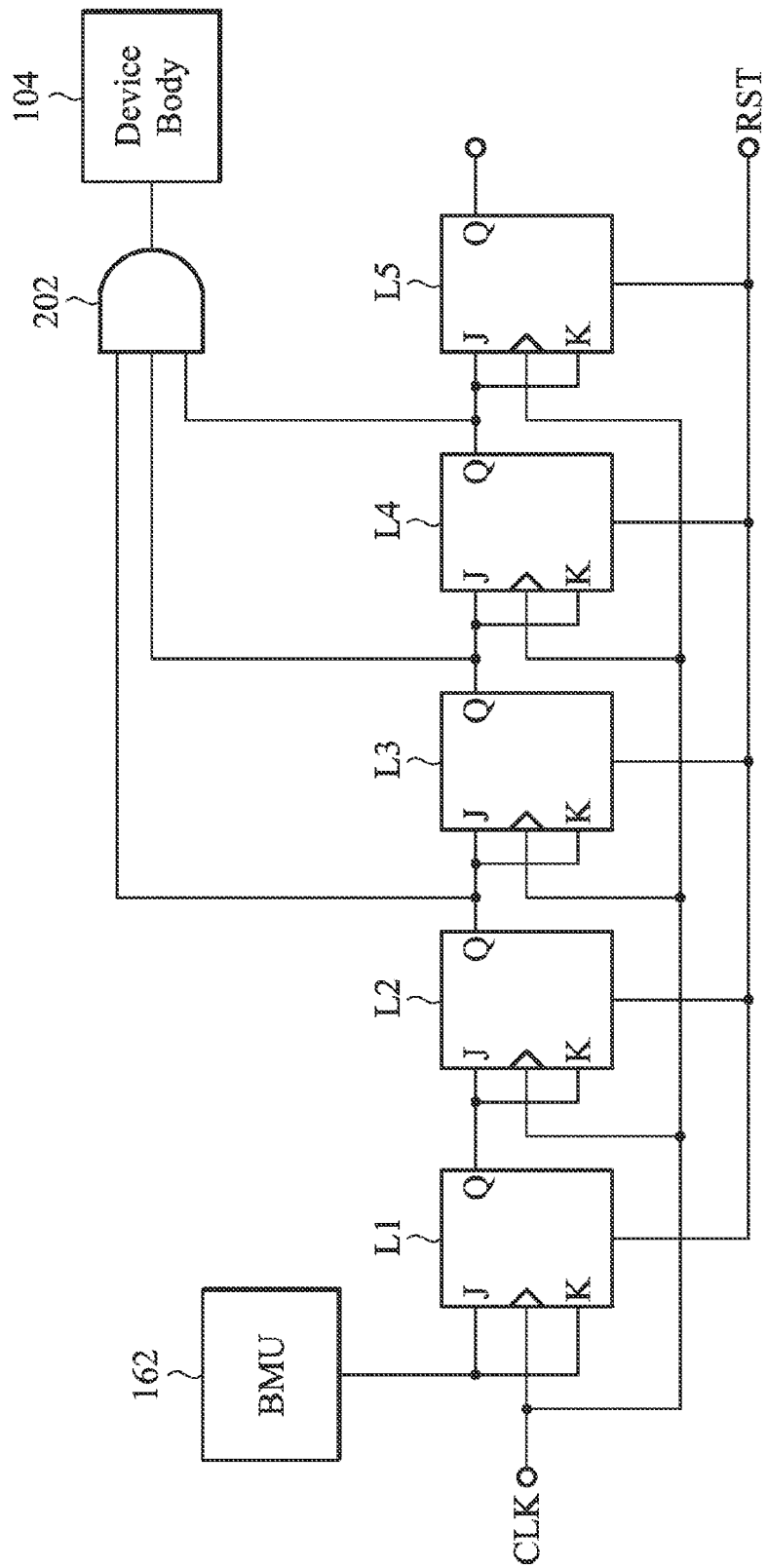
FIG. 2 depicts a circuit designed to implement the dynamic battery charging control logic 164.

In an exemplary embodiment, the most recent classified result is not taken into consideration by the battery charging controller 124. Instead, only a sector of historical information between the collected classified results is taken into consideration by the battery charging controller 124 for controlling the charging rate of the battery cell 114. FIG. 2 depicts a circuit designed to implement the dynamic battery charging control logic 164, which includes 2N+1 latches connected in series (as shown, N equals 2, 5 JK latches L1 to L5 controlled by a clock signal CLK and a reset signal RST are shown) and a logic circuit 202 connected to the latches. The most recent five (i.e. 2N+1, where N=2) classified results provided by the battery management unit 162 are temporally stored in the five latches L1 to L5. Except for the most recent one and the earliest one between the five classified results of the power consumption, a major classified power consumption status that most frequently occurs within the intermediate three historical data is identified by the logic circuit 202 and is conveyed to the device body 104 to modify the charging rate of the battery cell 114. In an exemplary embodiment, when most of the intermediate three historical data are lower than the temperature threshold and lower than the load threshold, the charging rate is set to be lower than a normal charging rate. For example, the charging rate may be set to 0.25 C, lower than a normal charging rate, 0.55 C. Note that the charging rate may be further divided into more levels.

Figure 3:
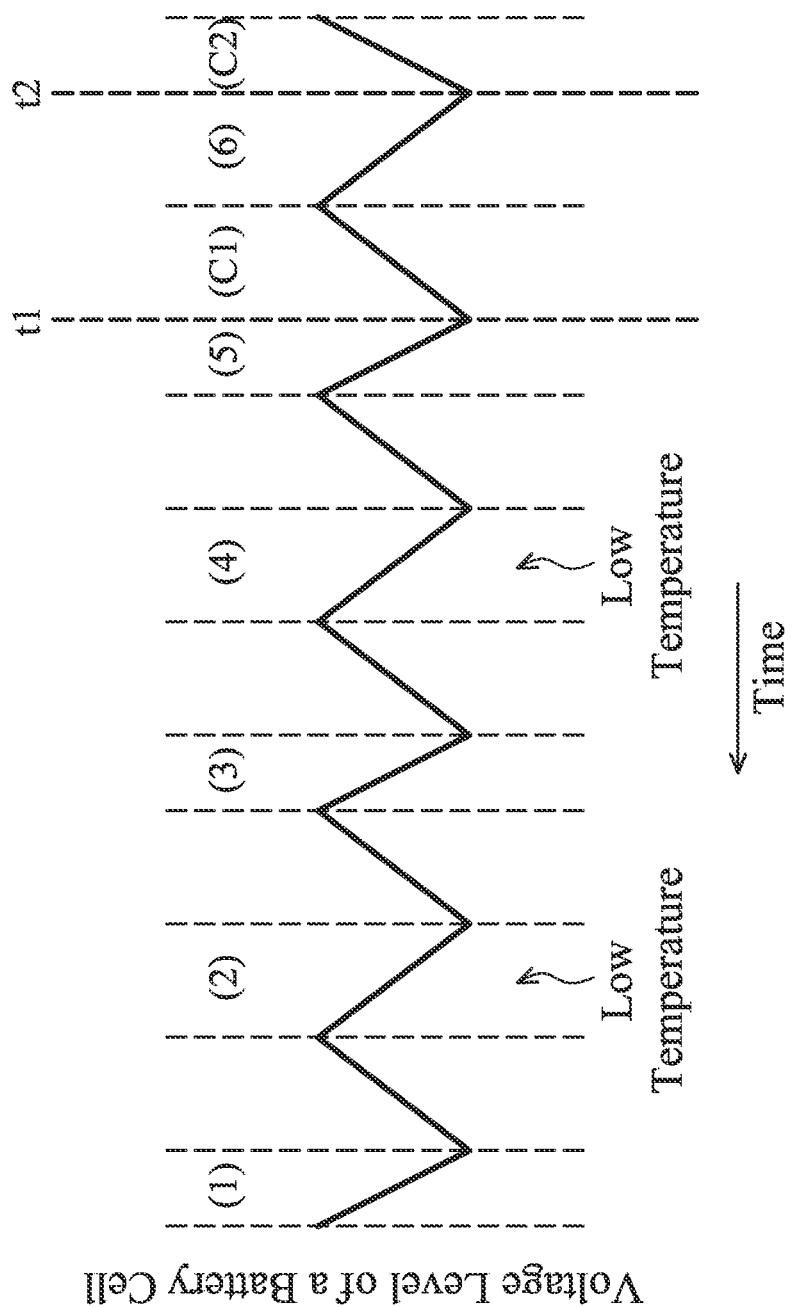
FIG. 3 shows a waveform depicting the charging/discharging of the battery cell 114, where past data is shown on the left.

FIG. 3 is a waveform depicting the charging and discharging of the battery cell 114, where the past data is shown on the left. In this exemplary embodiment, the load is classified into two levels (high or low load) and the temperature is classified into two levels (high temperature or low temperature), and the charging rate is switched between two levels (e.g., to be 0.25 C or 0.55 C.) At time t1, five classified results of the power consumption are collected, numbered from (1) to (5). Omitting the earliest and the most recent classified results (1) and (5), it shows that the majority of the remaining classified results (2) to (4) satisfy the low load and low temperature conditions. Thus, a charging strategy C1 is applied in charging the battery cell, by which the battery cell is charged at a low speed (e.g. 0.25 C). At time t2, the collected classified results of power consumption are updated to include those numbered from (2) to (6). Omitting the earliest and the most recent classified results (2) and (6), it shows that between the remaining classified results (3) to (5) only the classified result (4) is in the low load and low temperature conditions, which is the minority. Thus, a charging strategy C2 is applied in charging the battery cell, by which the battery cell is charged at a normal speed (e.g. 0.55 C).

The dynamic battery charging design is beneficial for a Lithium battery. By charging a low temperature and low load battery at a slow rate, the battery is effectively prevented from the crystallization problem of over discharging or the degradation problem of overcharging. A taper voltage/current of a device assembled with a rechargeable battery module is satisfied by using a proper number of classification levels to classify the power consumption and using a proper number of charging levels in the charging of the battery. Furthermore, according to the disclosure, it is not necessary to design different charging procedures for the different power consumption statuses of an electronic device (e.g., an electronic device may consume different power in the power-on mode S0, the sleep mode S1 and the power-off state S2). The disclosed technique is capable of coping with the charging requirements in different modes.

Figure 4:
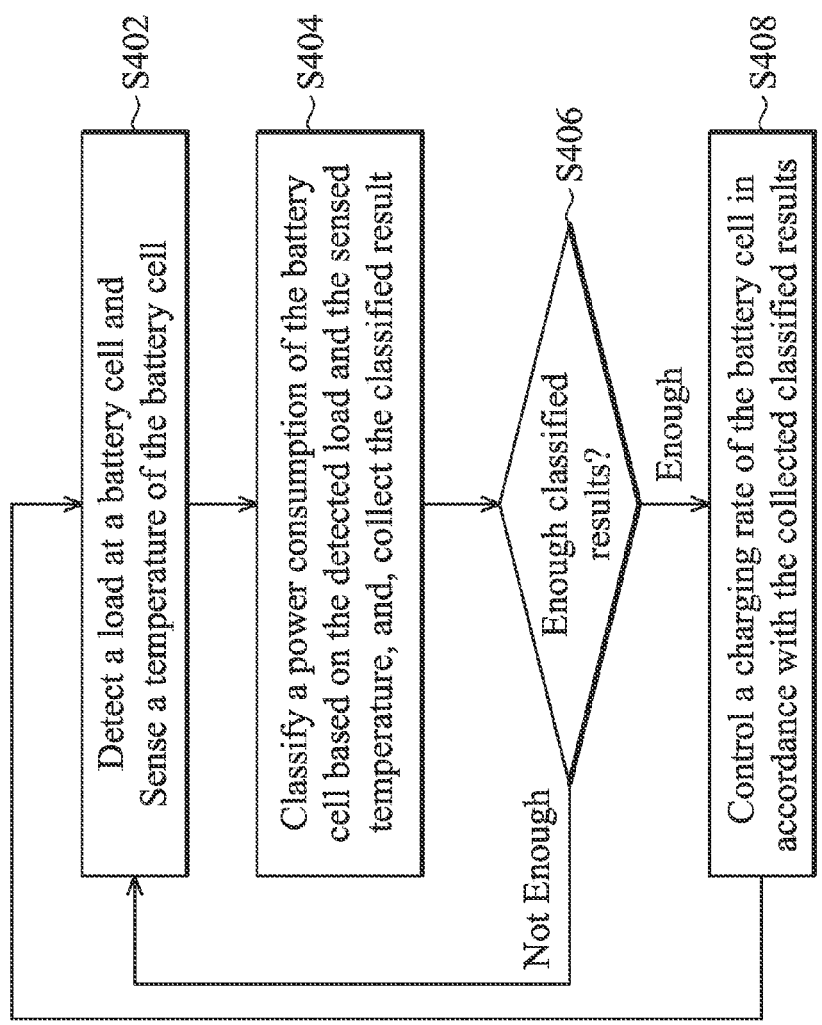
FIG. 4 is a flowchart depicting a battery-charging method in accordance with an exemplary embodiment of the invention.

FIG. 4 is a flowchart depicting a battery charging control method in accordance with an exemplary embodiment of the invention. In step S402, a load at a battery cell is detected and a temperature of the battery cell is sensed. In step S404, power consumption of the battery cell is classified based on the detected load and the sensed temperature, and, the classified result is collected. In step S406, it is checked whether enough classified results have been collected. In an exemplary embodiment, it is determined whether the number of collected classified results reaches 2N+1 during a predetermined time period (e.g. 48 hours), wherein N is in integer number. When the number of collected classified results is not enough, steps S402 and S404 are repeated. When a sufficient number of classified results have been collected, step S408 is executed, by which a charging rate of the battery cell is controlled in accordance with the collected classified results.

In an exemplary embodiment, in the step S408, the charging rate of the battery cell is controlled based on a section of historical data between the collected classified results.

In an exemplary embodiment, in the step S408, the charging rate is controlled to be lower than a normal charging rate when the majority of the section of historical data relate to a temperature condition lower than a threshold temperature and a load condition lower than a threshold load.

Figure 5A:
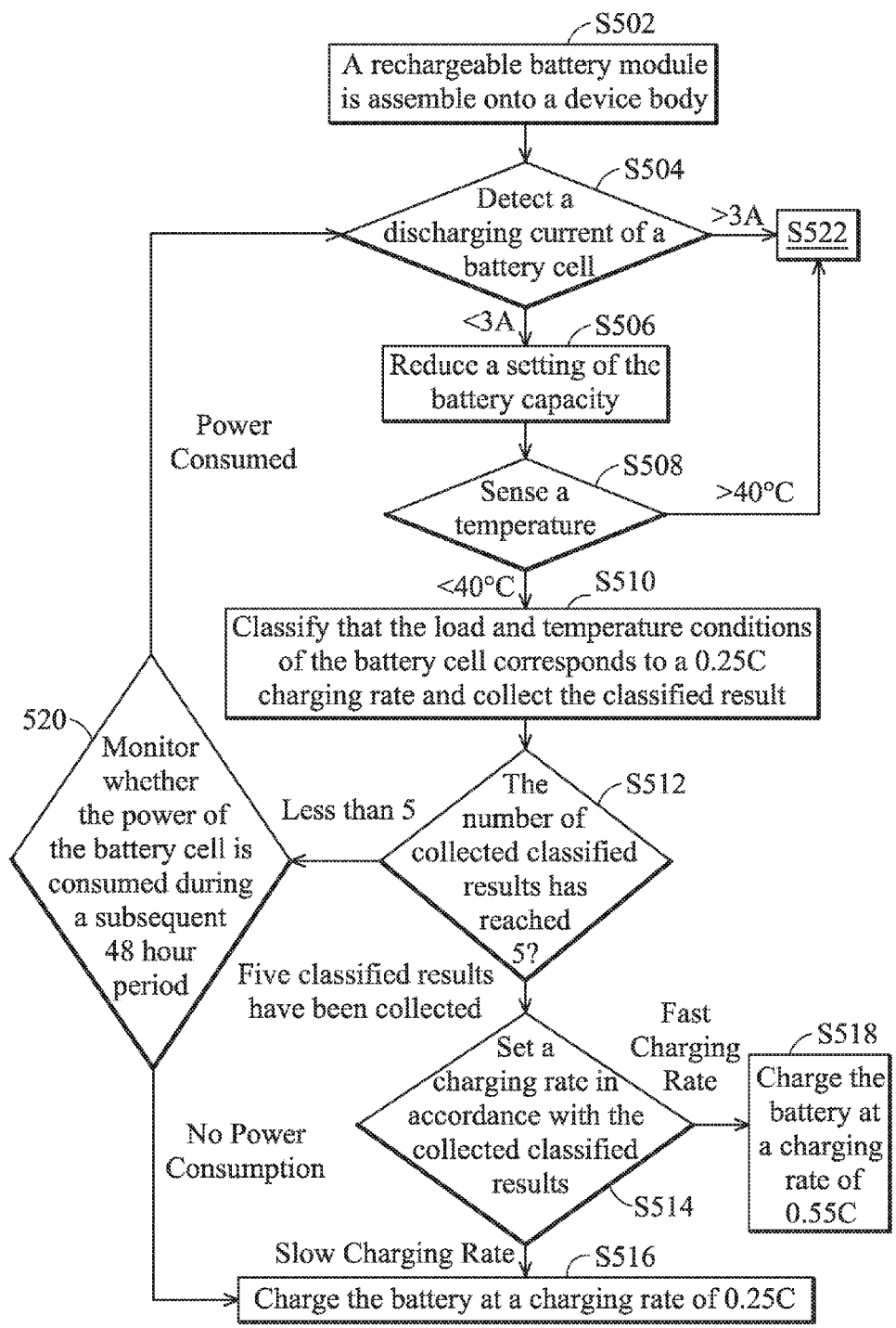
FIG. 5A and FIG. 5B show a flowchart depicting a battery-charging method in accordance with another exemplary embodiment of the invention.
Figure 5B:
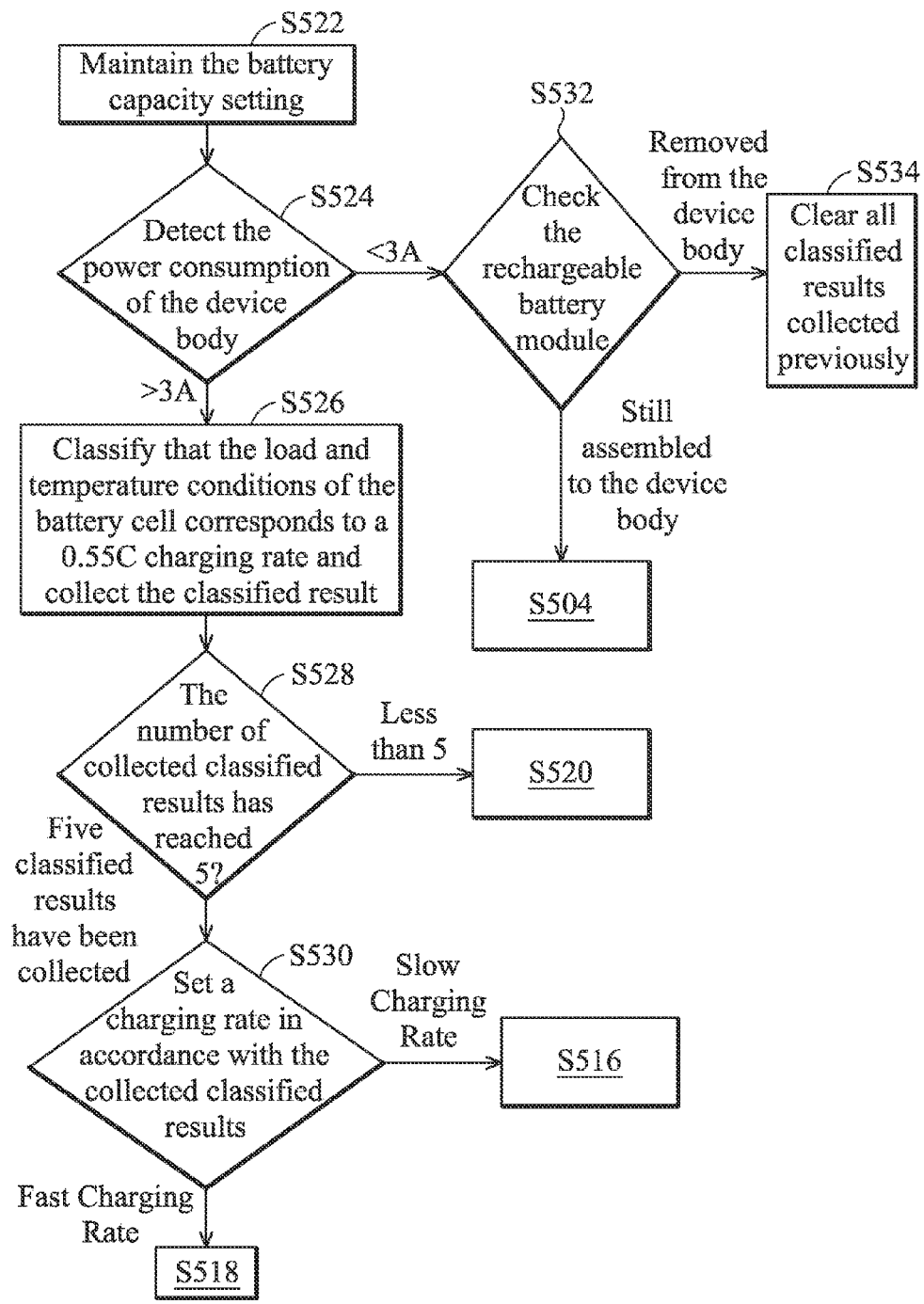

FIG. 5A and FIG. 5B show a flowchart depicting a battery-charging method in accordance with another exemplary embodiment of the invention. In the following, the battery-charging method is described with reference to FIG. 1.

In step S502, it is detected that the rechargeable battery module 102 is assembled onto the device body 104. In step S504, a discharging current of the battery cell 114 is detected. When the discharging current is lower than 3 A or is lower than a predetermined current value, step S506 is performed to reduce a battery capacity setting. In step S508, a temperature is sensed. When the temperature is lower than 40° C. or is lower than a predetermined temperature value, the step S510 is performed, by which the load and temperature conditions of the battery cell 114 is classified corresponding to a 0.25 C charging rate and the classified result is collected. In step S512, it is determined whether the number of collected classified results has reached 5. When five classified results have been collected, step S514 is performed, by which a charging rate is set in accordance with the collected classified results. For example, the charging rate may be set based on the intermediate three classified results of the collected five classified results. When it is determined that a slow charging rate is required, step S516 is performed to set the charging rate to be 0.25 C. When it is determined that a fast charging rate is required, step S518 is performed to set the charging rate to be 0.55 C.

Furthermore, when it is determined in step S512 that less than five classified results have been collected, step S520 is performed to monitor whether the power of the battery cell is consumed during a subsequent 48 hour period. When no power consumption is observed during the subsequent 48 hours, the step S516 is performed and the 0.25 C charging rate is adopted. When the power of the battery cell is consumed during the subsequent 48 hour period, step S504 is performed.

Furthermore, when it is determined in step S504 that the discharging rate of the battery is greater than 3 A (or greater than the predetermined current value) or it is determined in step S508 that the sensed temperature is greater than 40° C. (or greater than the predetermined temperature value), step S522 is performed and the battery capacity setting is maintained, and, step S524 is performed to detect the power consumption of the device body 104. When a current greater than 3 A (or greater than a predetermined current value) is detected, step S526 is performed and the present load and temperature conditions of the battery cell 114 are classified to correspond to the 0.55 C charging rate, and, the classified result is collected. In step S528, it is determined whether the amount of collected classified results has reached five. When less than five classified results have been collected, step S520 is performed. When the amount of collected classified results reaches five, step S530 is performed to set the charging rate in accordance with the collected classified results. For example, the charging rate may be set based on the intermediate three classified results of the collected five classified results. When it is determined that a slow charging rate is required, step S516 is performed to set the charging rate to be 0.25 C. When it is determined that a fast charging rate is required, step S518 is performed to set the charging rate to be 0.55 C.

Furthermore, when it is determined in step S524 that the detected current is lower than 3 A (or lower than the predetermined current value), the step S532 is performed to check the rechargeable battery module 102. When it is determined that the rechargeable battery module 102 is still assembled to the device body 104, step S504 is performed. When it is detected that the rechargeable battery module 102 has been removed, step S534 is performed and all classified results collected previously are cleared.

The steps introduced in FIGS. 5A and 5B are optional and dependent on user requirements. The criteria used in the determination steps (e.g., the current threshold, 3 A, or the temperature threshold, 40° C., or, the amount of collected data, 5) may be changed by the user. The time (e.g. 48 hours) required in the monitoring step S520 may be changed by the user.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rechargeable battery module, comprising:
   a battery cell;
   a load detector, detecting a load;
   a temperature sensor, sensing a temperature;
   a power consumption classifier, classifying power consumption based on the load detected by the load detector and the temperature sensed by the temperature sensor; and
   a battery charging controller, collecting a series of classified results output from the power consumption classifier to control a charging rate of the battery cell accordingly,
   wherein:
   the battery charging controller controls the charging rate based on a section of historical data of the series of classified results;
   the battery charging controller sets the charging rate to be lower than a normal charging rate when a majority of the section of historical data of the series of classified results shows a temperature condition lower than a temperature threshold and a load condition lower than a load threshold; and wherein the battery charging controller comprises:
- (2N+1) latches connected in series and temporarily stored with the last (2N+1) classified results, where N is an integer; and
- a logic circuit coupled to the (2N+1) latches, which observing a major classified power consumption status for setting the charging rate of the battery cell, wherein the major classified power consumption status is in the majority between the (2N+1) classified results except for the earliest and the most recent classified results between the (2N+1) classified results.

2. The rechargeable battery module as claimed in claim 1, wherein the power consumption classifier comprises:
- a load classifying unit coupled to the load detector, wherein the load classifying unit outputs a load flag to show whether a high load or a low load condition has been satisfied by the detected load;
- a temperature classifying unit coupled to the temperature sensor, wherein the temperature classifying unit outputs a temperature flag showing whether a high temperature or a low temperature condition has been satisfied by the sensed temperature;
- a logic circuit, generating a control signal based on the load flag and the temperature flag, wherein the control signal is at a first voltage level when the battery cell is in the low load condition and in the low temperature condition, otherwise, the control signal is at a second voltage level; and
- a voltage dividing circuit having a control transistor, wherein the voltage dividing circuit couples a voltage source to a ground terminal through a first resistance component and a second resistance component and, depending on the control signal, the control transistor is switched to change a resistance of the first or the second resistance components such that an output terminal of the voltage dividing circuit shows whether the battery cell is in the low load and the low temperature conditions.

3. The rechargeable battery module as claimed in claim 2, further comprising a voltage regulator which converts a voltage signal output from the battery cell for implementation of the voltage source.

4. The rechargeable battery module as claimed in claim 1, wherein the battery cell is implemented based on Lithium battery technology.

5. A battery-powered electronic device, comprising:
- a rechargeable battery module as claimed in claim 1, and
- a device body,
- wherein the rechargeable battery module is assembled to the device body and the device body is coupled to a power source via an adaptor and a power line to charge the rechargeable battery module.

6. A battery-charging method, comprising:
- detecting a load at a battery cell;
- sensing a temperature;
- classifying power consumption based on the detected load and the sensed temperature;
- collecting a series of classified results to control a charging rate of the battery cell accordingly;
- controlling the charging rate of the battery cell based on a section of historical data of the series of classified results, wherein the controlling operation further comprises;
    - using (2N+1) latches connected in series to temporarily store the last (2N+1) classified results, where N is an integer; and
    - using a logic circuit coupled to the (2N+1) latches to observe a major classified power consumption status for setting the charging rate of the battery cell, wherein the major classified power consumption status is in the majority between the (2N+1) classified results except for the earliest and the most recent classified results between the (2N+1) classified results; and
- setting the charging rate to be lower than a normal charging rate when a majority of the section of historical data of the series of classified results shows a temperature condition lower than a temperature threshold and a load condition lower than a load threshold.

7. The battery-charging method as claimed in claim 6, further monitoring the load and the temperature for a predetermined time period when it is determined that an amount of the classified results that have been collected is less than a predetermined amount, and, setting the charging rate to be lower than the normal charging rate when no classified result is collected during the predetermined time period.

8. The battery-charging method as claimed in claim 6, further detecting power consumption of a device body when the load at the battery cell is heavier than a load threshold or/and the sensed temperature is higher than a temperature threshold, and, further checking whether the battery cell has been removed from the device body when the detected power consumption of the device body is lower than a power consumption threshold, and, further clearing the classified results when it is determined that the battery cell has been disassembled from the device body, and, repeating the steps of detecting the load at the battery cell and sensing the temperature again when it is determined that the battery cell is still assembled to the device body.

* * * * *